No. 783,753. PATENTED FEB. 28, 1905.
E. J. MOUGETTE.
LUBRICATOR.
APPLICATION FILED APR. 30, 1904.

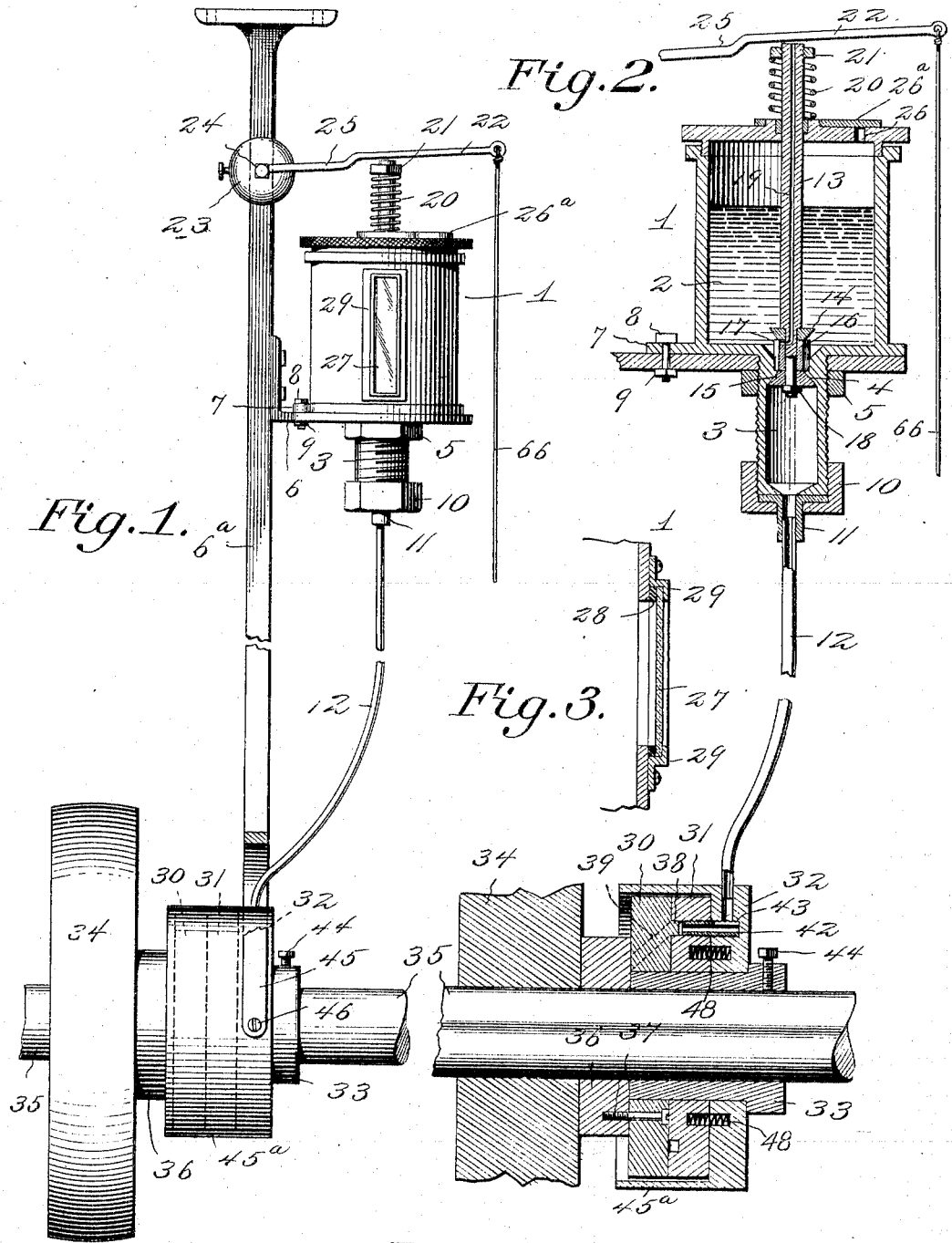

2 SHEETS—SHEET 2.

No. 783,753.

Patented February 28, 1905.

UNITED STATES PATENT OFFICE.

EMIL J. MOUGETTE, OF CHICAGO, ILLINOIS.

LUBRICATOR.

SPECIFICATION forming part of Letters Patent No. 783,753, dated February 28, 1905.

Application filed April 30, 1904. Serial No. 205,776.

*To all whom it may concern:*

Be it known that I, EMIL J. MOUGETTE, a citizen of the United States, residing at Chicago, in the county of Cook and State of Illinois, have invented a new and useful Lubricator, of which the following is a specification.

This invention relates generally to lubricators, and particularly to that class adapted for oiling loose pulleys and line and counter shafts.

The object of the invention is in a ready, simple, thoroughly efficient, and practical manner and without waste of the lubricant to effect oiling of a loose pulley or shaft or a series of such pulleys or shafts from the floor while such parts are running.

With the above and other objects in view, as will appear as the nature of the invention is better understood, the same consists in the novel construction and combination of parts of a lubricator, as will be hereinafter fully described and claimed.

In the accompanying drawings, forming a part of this specification, and in which like characters of reference indicate corresponding parts, there are illustrated two forms of embodiment of the invention each capable of carrying the same into practical operation, it being understood that the elements therein exhibited may be varied or changed as to shape, proportion, and exact manner of assemblage without departing from the spirit thereof.

In the drawings, Figure 1 is a view in side elevation of a lubricator constructed in accordance with the present invention. Fig. 2 is a view in vertical section. Fig. 3 is a detail sectional view showing the sight-gage combined with the oil-cup. Fig. 4 is a face view of the oil-distributer. Fig. 5 is a similar view of the oil-conveyer. Fig. 6 is a similar view of the oil-receiver. Fig. 7 is a detail view of a slightly-modified form of lubricator. Fig. 8 is a view in side elevation, exhibiting a lubricator in which a plurality of valves are combined. Fig. 9 is a top plan view of Fig. 8. Fig. 10 is a detail view of a modified form of gage that may be employed.

The lubricator of the present invention is designed as an improvement upon one for which I secured Letters Patent of the United States, dated June 9, 1903, No. 730,784.

The novelty of the present invention resides in certain improvements in the oil-cup and in certain novel features of the means for receiving, conveying, and distributing the oil to the parts to be lubricated.

In the drawings, 1 designates the oil-cup, comprising a receiving-chamber 2 and a distributing-chamber 3. The receiving-chamber is provided at its lower portion with a valve-seat 4, the lower face of which projects below the bottom of the chamber and is externally threaded for engagement by a nut 5, designed to clamp an L-shaped arm 6 against the cup-bottom, the said arm being adapted to sustain the cup and is to be secured to any suitable overhead support, as to a hanger 6ª. In addition the cup is provided with an ear 7, through which and the arm passes a bolt 8, carrying at its lower end a nut 9 to secure the bolt in position, the said bolt operating positively to prevent any rotary movement of the cup. The lower projecting portion of the valve-seat carries a socket-nut 10, which is provided for the purpose of clamping a nipple 11 against the under side of the seat, the nipple having combined with it a pipe or conduit 12, which leads to the lubricating device presently to be described.

The valve-stem 13 is tubular and carries near its lower end a pair of cone-shaped valves 14 and 15, the apices of which oppose each other and are held spaced the proper distance apart by a tubular bushing 16, having guide-wings 17, a nut 18, screwed onto the lower end of the valve-stem, serving to clamp the two valves in proper operative relation with each other upon the stem. The bore 19 of the stem opens outward beneath the upper valve 14 and is provided for the purpose of venting the cup and insure proper escape of the oil. The upper end of the valve-stem carries a coiled spring 20, which is adapted to bear upon the top of the cup and upon the under side of a nut 21, which serves to prevent disconnection of the spring from the stem. The valve-stem is depressed for the purpose of permitting the discharge of oil to the part to be lubricated through the medium of a lever 22, which is fulcrumed upon a ball 23, slidably mounted upon the hanger 6ª and held in any desired position thereon by a bolt 24. The object for thus supporting the ball on the hanger is to permit of such adjustment of the lever 22 with relation to the valve-stem as may be necessary. In order to cause the lever to impinge the top of the valve-stem in a position at right angles to its length, thus to obviate any tendency of lateral pressure which might cause the stem to bind in the cup, the lever is provided with an upcurve 25 adjacent to its fulcrum, which will cause it normally to occupy a position slightly at an angle to the long diameter of the stem. Upon depression of the valve-stem a charge of oil escapes to the distributing-chamber, whence it passes through the pipe 12 to the part to be lubricated. The top of the cup is provided with an oil-feed opening 26, which is normally covered by a pivoted plate 26ª, swiveled upon the center of the top of the cup.

In order to determine when the cup needs refilling, the latter is provided with a sight-gage 27, consisting of a strip of glass seated in a recess in one side of the cup, escape of oil around the gage being prevented by the employment of a packing 28, which is firmly clamped against the cup and the gage by a clamp-plate 29, riveted or otherwise secured to the cup, the said plate being provided with an opening through which the glass will be seen. The gage will extend from near the top to a point near the bottom of the cup, thus to enable an attendant always to ascertain the amount of oil contained therein.

In lieu of the sight-gage above described an ordinary float-gage, as shown in Fig. 10, may be employed, which comprises a cork float 29ª and a shank or stem 29ᵇ. The shank or stem will project through an opening in the top of the oil-cup, and by observing it the operator can tell when the cup needs replenishing with oil.

The lubricator comprises three disks 30, 31, and 32, constituting, respectively, an oil-distributer, an oil-conveyer, and an oil-receiver, and a collar 33 for holding the disks properly assembled with relation to each other and for preventing the pulley 34 from having too great play upon its shaft 35. The oil-distributer 30 is secured to the hub 36 of the pulley in any preferred manner, as by screws or pins 37, and is provided with a fin or curved flange 38, which projects laterally from one of its faces, and with two orifices 39, disposed adjacent to the terminals of the fins. The orifices are obliquely disposed with relation to the periphery of the oil-distributer and serve to conduct the lubricant to the pulley-hub and thence to the shaft, the orifices on the fin-carrying side of the oil-distributer having channels or ways 40 leading thereto for the purpose of assisting the oil in entering the orifices. In practice but one of these orifices will be used at a time, according to which way the pulley may be running, the other one being closed by a wooden plug or other suitable closure when not in use. The fin 38 is designed to engage a circular groove or recess 41, formed in the face of the oil-conveyer 31, and communicating with the groove 41 is a tube 42, which projects beyond the face of the oil-conveyer 31 opposite the groove 41 and enters an orifice in the oil-receiver 32, the end of the tube 42 being provided with an oval orifice 43, into which projects the pipe 12, leading from the oil-cup. The collar 33 is clamped to the shaft by a set-screw 44 and turns at all times therewith, and the oil-distributer 30, as above stated, is secured to the hub of the pulley and turns at all times therewith; but the oil-conveyer 31 and oil-receiver 32 are supported by the bail or yoke 45 of the hanger 6ª, the arms of which in this instance straddle the oil-receiver 32 and are secured by oppositely-alined bolts 46 thereto. The oil-receiver 32 is provided with a hollow cylindrical extension 45ª, which operates to house the oil-distributer and the oil-conveyer, and thus protect them from injury and from becoming foul with dirt or dust. Of course it is to be understood that the collar 33 will not engage the oil-receiver 32 with any such degree of frictional contact as will tend to strain the yoke-arms. In order to hold the oil-conveyer and oil-receiver against any rotary movement relatively to each other, the oil-conveyer 31 is provided with a plurality of threaded sockets which are engaged by laterally-projecting threaded pins 47, that engage alined sockets 32ª in the oil-receiver, and to hold the oil-conveyer and oil-receiver against the collar and the oil-distributer springs 48 are employed, which are seated in alined sockets 48ª in the opposing faces of the oil-conveyer and oil-receiver. Of the pins 47 there may be any desired number—in this instance two—and of the springs there are employed in this instance four; but it is to be understood that the number of these elements may be changed and still be within the scope of the invention.

The operation of the apparatus thus far described is as follows: When the lever 22 is pulled down, a charge of oil passes from the cup to the distributing-chamber 3, thence through the pipe 12 to the tube 42, and thence to the groove 41 of the oil-conveyer. As oil enters this groove it is gathered up by the fin 38 and is forced through one of the orifices 39 down to the pulley-hub and thence to the shaft. Of course it is to be understood that a succession of charges of oil may be supplied to the pulley by drawing down several times upon the lever 21.

In the form of embodiment of the invention shown in Fig. 7 there is provided a collar or shell 49, which is held upon a shaft 50 and in proper spaced relation with regard to the pulley-hub 51 by a collar 52, which is held against movement upon the shaft by a set-screw 53.

The shell 49 is provided with a flange 54, which extends parallel with the shaft and slightly overhangs the pulley-hub, and secured to this flange is a brass ring or annulus 55, which is held properly combined with the flange through the medium of pins 56, carried by the ring and projected through lateral slots in the flange 54. To hold the ring in engagement with the face of the pulley-hub, a plurality of coiled springs 58 are employed, which bear against the ring and are seated in sockets 59, formed in the shell. The oil from the pipe 12 enters a tube 60, seated in a longitudinal socket in the shell and having a screw-threaded connection with the ring 55, the hub in this instance being provided with a fin 61, corresponding to the fin 38, and which engages a groove 62, arranged in the face of the ring 55, and with a discharge-duct 62$^a$, through which the oil is fed to the shaft. The shell is held against rotation through the medium of a yoke similar to that described. In the operation of this form of apparatus the fin 61 forces the oil escaping to the groove 62 past the opening in the tube 60 and into the duct 62$^a$, where it is distributed by the speed of rotation of the pulley.

In Figs. 8 and 9 there is illustrated a modified form of lubricator, in which provision is made for lubricating a series of bearings from one cup. The device consists of an oil-cup 63, preferably oval in shape, with the bottom portion of which will be combined a plurality of controlling-valves, the same as those shown in Figs. 1 and 2. The means for operating the valves, however, is slightly different from that shown in the above-named figures. Instead of employing the levers, as shown in the said figures, a plurality of rods 64 are used, the upper ends of which are bent at an angle to their length and are placed upon the valve-stems and bear upon the springs thereof and are held thereon by nuts 65. The lower ends of the rods have connected with them ropes or chains 66, by which the rods may be depressed, thus to effect opening of the valves. The top of the cup is provided with a filling-opening, which is normally closed by a cover 67.

It will be seen from the foregoing description that although the devices shown in this invention are exceptionally simple of construction they will be found thoroughly efficient and durable in use and may be relied upon for doing positive work under all conditions.

Having thus fully described the invention, what is claimed is—

1. In a lubricator, the combination with a shaft, of a stationary oil-distributer and an oil-conveyer provided with an oil-receiving groove, and a revoluble distributer having a part to engage the groove to remove the oil therefrom and provided with means for distributing the oil.

2. In a lubricator, the combination with a shaft, of a collar secured thereon, an oil-receiver stationary on the collar, means for supplying oil in measured quantities to the receiver, an oil-conveyer and a revoluble oil-distributer, and means for removing the oil from the distributer to the part to be lubricated.

3. In a lubricator, the combination with a shaft, of a collar secured thereon, an oil-receiver and an oil-conveyer stationary on the collar, an oil-distributer mounted for rotation upon the collar, means for feeding the oil from the receiver to the conveyer, and means for feeding the oil from the conveyer to the distributer.

4. In a lubricator, the combination with a shaft, of a collar secured thereon, an oil-receiver and an oil-conveyer stationary upon the collar, an oil-distributer loose upon the collar, and means for supplying oil from the receiver to the distributer.

5. A lubricator comprising an oil-receiver and an oil-conveyer yieldably connected, and an oil-distributer adapted for rotation against the conveyer.

6. A lubricator comprising a cap-like oil-receiver, an oil-conveyer and an oil-distributer housed within the receiver, and means for supplying oil to the receiver.

7. A lubricator comprising a cap-like oil-receiver, an oil-conveyer yieldably connected therewith, and an oil-distributer coöperating with the conveyer, the oil-distributer and oil-conveyer being housed within the receiver.

8. In a lubricator, the combination of an oil-receiver and an oil-conveyer, the opposed faces of which are provided with sockets, and the outer face of the oil-conveyer being provided with a circular groove, springs and pins seated in the sockets, means for supplying oil to the receiver, means for feeding the oil from the receiver to the groove in the conveyer, and a revoluble oil-distributer having a fin to engage the groove in the conveyer to remove the oil therefrom and ducts for distributing the oil to the part to be lubricated.

9. In a lubricator, the combination with a shaft, a collar fast thereon and provided with a sleeve, an oil-receiver and an oil-conveyer loosely mounted upon the sleeve, the opposed faces of which are provided with sockets and the outer face of the oil-conveyer being provided with a circular groove, pins mounted in certain of the sockets for holding the receiver and conveyer against rotation with relation to each other, an oil-distributer provided with a fin to engage the groove within the conveyer and with distributing-ducts, springs mounted in the remaining sockets for holding the receiver and conveyer against the collar and distributer, an oil-supply pipe connecting with the receiver, and a duct for feeding the oil from the receiver to the groove in the conveyer.

10. In a lubricator, the combination with an oil-cup having its lower portion provided with an oil-chamber, and a double-valve seat and provided intermediate of its ends with wings, a double valve to engage the seats, a hollow stem to which the valves are secured, the upper end of the stem being projected above the top of the cup, a spring mounted upon the projecting end, means for holding the spring against separation from the same, and a lever disposed to engage the stem and depress it.

11. In a lubricator, an oil-cup carrying at its lower side a plurality of extensions constituting oil-chambers, a double-acting valve mounted in each of the chambers, a spring-pressed valve-stem connected with each valve and projecting above the top of the cup, and means for separately actuating either of the valve-stems.

In testimony that I claim the foregoing as my own I have hereto affixed my signature in the presence of two witnesses.

EMIL J. MOUGETTE.

Witnesses:
ANDREW BAUMGARTNER,
F. AUGUST REICH.